(12) United States Patent
Hakala (10) Patent No.: US 8,024,052 B1
(45) Date of Patent: Sep. 20, 2011

(54) ADAPTIVE MAPPING OF DEVICE OUTPUT CHANGE TO AMOUNTS OF CONTROL EFFORT

(76) Inventor: Tim Hakala, Tucson, AZ (US)

( * ) Notice: Subject to any disclaimer, the term of this patent is extended or adjusted under 35 U.S.C. 154(b) by 549 days.

(21) Appl. No.: 11/744,173

(22) Filed: May 3, 2007

Related U.S. Application Data (60) Provisional application No. 60/909,403, filed on Mar. 30, 2007.

(51) Int. Cl.
G05B 13/02 (2006.01)
A63B 71/00 (2006.01)
H02K 41/02 (2006.01)
H03K 17/94 (2006.01)

(52) U.S. Cl. ...... 700/28; 341/20; 273/148 R; 310/12.12; 310/12.13

(58) Field of Classification Search ............ 700/28
See application file for complete search history.

(56) References Cited

U.S. PATENT DOCUMENTS 5,602,689 A * 2/1997 Kadlec et al. .............. 360/78.04
6,002,184 A * 12/1999 Delson et al. ................. 310/14

OTHER PUBLICATIONS

Tim T. Hakala, Dec. 2005, Brigham Young University, "Settling-Time Improvements in Positioning Machines Subject to Nonlinear Friction Using Adaptive Impulse Control", 180 pages.*
Tim, T. Hakala, Dec. 2005, ProQuest 183 pages.*
Tim, T. Hakala, 2006, ProQuest Document View—Settling-time improvements in positioning machines subject to nonlinear friction using adaptive impulse control, 2 pages.*

S. Yang and M. Tamizuka. *Adaptive pulse width control for precise positioning under the influence of stiction and coulomb friction.* Transactions of the ASME Journal of Dynamic Systems, Measurement, and Control, 110:221-227, Sep. 1988.
Brian Armstrong, et al; Miscellaneous Mechanical Control Systems. The Control Handbook, 1369-1382, 1996.
Brian Armstrong-Helouvry; Control of machines with friction; (contents, preface); 1991.
Brian Armstrong-Helovury, et al; A survey of Models, Analysis Tools and Compensation Methods for Control of Machines with Friction; Automatic, vol. 30, No. 7 pp. 1083-1138; 1994.
Karl J. Astrom, et al; PID Control; The Control Handbook, 198-209; 1996.
Karl Johan Astrom, et al; Adaptive Control; (contents); 1995.
S. Bjorklund; A Random Model for Micro-Slip Between Nominally Flat Surfaces; Transactions of the ASME Journal of Tribology; 726-732, Oct. 1997.
Li Chun Bo, et al; The Friction-Speed Relation and Its Influence on the Critical Velocity of Stick-Slip Motion; Wear, 82, pp. 277-289; 1982.

(Continued)

*Primary Examiner* — Albert Decady
*Assistant Examiner* — Sunray R Chang
(74) *Attorney, Agent, or Firm* — Workman Nydegger (57) ABSTRACT

Systems and methods for controlling and monitoring equipment in control systems. Adaptive mapping of system output change to amounts of applied control effort. Methods are disclosed to define, initialize, and tune a particularly efficient, log-spaced mapping. Self-tuning update methods cause the control map to improve with use and provides excellent convergence to the actual nonlinear relationship between control input and device output. As the mapping converges to the actual relationship, system performance is optimized when used for purposes of control. Methods pertaining to the specific instance of adaptive impulse control are disclosed. As the mapping converges and tracks what may be a time-varying relationship due to equipment wear or changing operating conditions, drift from baseline conditions can be detected.

28 Claims, 5 Drawing Sheets

OTHER PUBLICATIONS

F.P Bowden, et al.; The Friction and Lubrication of Solids; (preface, contents);1954.

Michael S. Branicky; Multiple Lyapunov Functions and Other Analysis Tools for Switched and Hybrid Systems; IEEE Transactions on Automatic Control; vol. 43, No. 4, pp. 475-482; Apr. 1998.

David W. Clarke; Self-Tuning Control; the Control Handbook, 827-846; 1996.

P.R. Dahl; Measurement of Solid Friction Parameters of Ball Bearings; The Aerospace Corporation, El Segundo, CA; pp. 49-60; 1977.

R.A. Decarlo, et al.; Variable Structure, Sliding-Mode Controller Design; The Control Handbook; 941-951; 1997.

C. Canudas De Wit, et al; Adaptive Friction Compensation With Partially Known Dynamic Friction Model; International Journal of Adaptive Control and Signal Processing, vol. 11, 65-80; 1997.

C. Canudas De Wit; A New Model for Control of Systems with Friction; IEEE Transactions of Automatic Control, vol. 40. No. 3 419-425; Mar. 1995.

Pierre E. Dupont, et al; Friction Modeling and Control in Boundary Lubrication; Aerospace and Mechanical Engineering, Boston University; pp. 1910-1915; Jun. 1993.

Pierre Dupont, et al; Single State Elastoplastic Friction Models; IEEE Transactions on Automatic Control, vol. 47, No. 5 787-792; May 2002.

Gene F. Franklin, et al; Feedback Control of Dynamic Systems; Third Edition (contents); 1990.

Gene F. Franklin, et al; Digital Control of Dynamic Systems; Second Edition (contents); 1990.

Dudley D. Fuller; Theory and Practice of Lubrication for Engineers; Second Edition; (contents, introduction);1984.

Shigeru Futami, et al; Nanometer positioning and its micro-dynamics; Nanotechnology 1, 31-37; Received Mar. 6, 1990.

D.P. Hess, et al; Friction at a Lubricated Line Contact Operating at Oscillating Sliding Velocities; Transactions of the ASME Journal of Tribology; vol. 112, 147-152, Jan. 1990.

Yusof Hojjat, et al; Application of Electromagnetic Impulsive Force to Precise Positioning; Int. J. Japan Soc. Prec. Eng. vol. 25, No. 1, Mar. 1991.

Doyoung Jeon; Learning Hybrid Force and Position Control of Robot Manipulators; IEEE Transactions on Robotics and Automation; vol. 9, No. 4, 423-431; Aug. 1993.

Jeong-Yul Jeon, et al; Experimental Evolutionary Programming-Based High-Precision Control; IEEE Control Systems; 66-74; Apr. 1997.

I. Johannes; et al; Short Communication; Wear, 24, 381-385; 1973.

David Kahaner, et al; Numerical Methods and Software; (contents);1973.

Jong-Hwan Kim, et al; Identification and Control of Systems with Friction Using Accelerated evolutionary Programming; IEEE Control Systems; 38-47; Aug. 1996.

Guangjun Liu, et al; Comparative Study of Robust Saturation-based Control of Robot Manipulators: Analysis and Experiments; The International Journal of Robotics Research; vol. 15. No. 5, 473-491; Oct. 1996.

C. Moler, et al; Interpolation; Chapter 3; Feb. 15, 2008.

Kevin L. Moore; Iterative Learning Control for Deterministic Systems; (contents);1993.

Kevin L. Moore; An Introduction to Iterative Learning Control; Center for Self-Organizing and intelligent Systems, Dept of Electrical Engineering, Utah State University, 2003.

Guilluame Morel, et al; The Precise Control of Manipulators With Joint Friction: A Base Force/Torque Sensor Method; IEEE International Conference on Robotics and Automation; 360-365; Apr. 1996.

Moser, et al.; Response of a Coulomb System to Stochastic Excitation; International Business Machines Corporation; Journal of Sound and Vibration pp. 223-235; Jul. 10, 1992.

Henrick Olsson et al.; Friction Generated Limit Cycles; IEEE Transactions on Control Systems Technology, vol. 9, No. 4, Jul. 2001.

Jong Hyeon Park et al.; Time-Delay Sliding Mode Control for a Servo; Journal of Dynamic Systems, Measurement, and Control vol. 121 pp. 143-148; Mar. 1999.

M.R. Popovic et al.; Fuzzy Logic Controller for Accurate Positioning of Direct-Drive Mechanism Using Force Pulses; IEEE International Conference on Robotics and Automation; pp. 1166-1171; 1995.

M.R. Popovic et al.; A Study of Response to Short Torque Pulses and Fuzzy Control of Positioning for Devices with Stick-slip Friction; pp. 302-307; IEEE 1995.

M.R. Popovic et al; High-Precision Positioning of a Mechanism with Nonlinear Friction Using a Fuzzy Logic Pulse Controller; IEEE Transactions on Control Systems Technology; vol. 8, No. 1, Jan. 2000.

Ernest Rabinowicz.; Friction and Wear of Materials; Wiley Series on the Science and Technology of Materials; pp. ix and 1 (preface, contents and introduction); Oct. 1964.

Clark J. Radcliffe et al.; A Property of Stick-Slip Friction Models which Promotes Limit Cycle Generation; pp. 1198-1205; 1990.

David B. Rathbun et al.; Piecewise-Linear-Gain Pulse Width Control for Precise Positioning of Structurally Flexible Systems Subject to Stiction and Coulomb Friction; Journal of Dynamic Systems, Measurement and Control vol. 126, pp. 139-143; Mar. 2004.

David B. Rathbun et al.; Pulse Width Control for Precise Positioning of Structurally Flexible Systems Subject to Stiction and Coulomb Friction; Journal of Dynamic Systems, Measurement and Control vol. 126, pp. 131-138; Mar. 2004.

R.S. H. Richardson et al.; Surface Friction Under Time-Dependent Loads; Dept of Mechanical Engineering, Monash University; Received Sep. 10, 1975.

F. Sadeghi et al.; Compressible Elastohydrodynamic Lubrication of Rough Surfaces; Transactions of the ASME, vol. 111 pp. 56-62; Jan. 1989.

Jan Swevers et al.; An Integrated Friction Model Structure with Improved Presliding Behavior for Accurate Friction Compensation; IEEE Transactions on Automatic Control, vol. 45, No. 4, Apr. 2000.

D. M. Tolstoi; Significance of the Normal Degree of Freedom and Natural Normal Vibrations in Contact Friction; Dept of Physics, Moscow Machine-Tool and Tool Institute USSR; Received Jul. 11, 1966.

E.D. Tung et al.; Low Velocity Friction Compensation and Feedforward Solution Based on Repetitive Control; Journal of Dynamic Systems, Measurement, and Control, vol. 115, pp. 279-284; Jun. 1993.

Robert B. Van Varseveld et al.; Accurate Position Control of a Pneumatic Actuator Using on/Off Solenoid Valves; IEEE International Conference on Robotics and Automation, Albuquerque, NM; pp. 1196-1201; Apr. 1997.

Ruh-Hua Wu et al.; Studies of Stick-Slip Friction, Presliding Displacement, and Hunting; Journal of Dynamic Systems, Measurement, and Control, vol. 124, pp. 111-117; Mar. 2002.

\* cited by examiner

ADAPTIVE MAPPING OF DEVICE OUTPUT CHANGE TO AMOUNTS OF CONTROL EFFORT

CROSS-REFERENCE TO RELATED APPLICATIONS

This application claims the benefit of U.S. Provisional Application Ser. No. 60/909,403, filed Mar. 30, 2007 and entitled PRECISION CONTROL IN POSITION MACHINES, which application is incorporated herein by reference in its entirety.

BACKGROUND OF THE INVENTION

1. The Field of the Invention

The present invention relates to systems and methods for controlling and monitoring equipment in control systems. Embodiments of the invention relate to the precise control of devices, particularly when physics of the system result in constitutive relations between input and output that are nonlinear or time varying. Furthermore, embodiments of the invention provide a means for tracking how input to output relations of the system drift with time, thus providing a means of monitoring the characteristic condition or health of equipment. Embodiments of the invention define, initialize, tune, and/or monitor a particularly efficient, log-spaced control map to identify how the relationship between the strength or duration of control effort is mapped to amounts device output change that result from the applied effort. The invention further embodies methods for accessing and using the map to generate control signals used to precisely control the output of a system or process. The invention also embodies methods for monitoring when the system under control may fail to operate properly as the result of time varying operating conditions or failing equipment health.

Adaptive methods embodied in the invention take into account local control effort sensitivity as part of a self-tuning update that can be enabled at the end of each step in the control process. This update method causes the control map to improve with use and provides for excellent convergence to the actual nonlinear relationship between control input and device output that is exhibited by a system. As the mapping converges to the actual relationship, system performance is optimized because the amount of effort needed to change the system output by a desired amount can be directly obtained from the map. As the mapping converges and tracks what may be a time-varying relationship due to equipment wear or changing operating conditions, drift from baseline conditions can be detected, monitored, and used to alert the operator when system maintenance will be required.

2. The Relevant Technology

There are many systems and environments where the output of a controlled device or process must be changed from one state to another. Many of these systems require precise control of the system output. Precision movement is needed, for example, in positioning the hardware that can read media such as heads in hard disk drives, controlling semiconductor fabrication equipment, controlling microscope tables, controlling machines that place surface mount parts onto printed wiring boards, positioning of process control valves, controlling arms and articulators in robotics, controlling biotechnology manufacturing equipment, and the like. The ability to precisely control the output of a system can produce better results in many applications. Precise position control for example can allow for increased information storage densities, quicker device access times, more rapid device assembly, more accurate machining, more accurate and rapid placement of parts, improved mixtures, more accurate flow control, improved manufacturing quality, improved yields, and the like.

In addition to providing a means for precise control, the ability to detect changes in system equipment by monitoring the relationships between system inputs and outputs can be useful, for example, in alerting an operator of the need for immediate or upcoming maintenance to avoid unplanned shutdowns.

Precise control is difficult to achieve for various reasons. One of the prominent challenges facing precise control in systems that control position is friction. While friction occurs in all mechanisms involving relative motion, friction is not constant and is not easy to accurately model. Friction, for example, can vary as a function of velocity, displacement, temperature, time, path, and the like. In fact, it is the non-linearity of friction that makes it difficult to improve the precision of position control systems. Friction makes precision control at low velocities or over short displacements particularly difficult.

In order to overcome or compensate for the effects of friction, conventional control often employs feedback control wherein the output of the system is measured and compared to the desired position. A difference between the desired position and present actual position signals the need for corrective action. A linear combination of the difference between the desired position and the present actual position, the derivative of that difference, and the integral of that difference are often used to calculate the strength of the corrective action. While this type of approach is straightforward, robust, and often effective for coarse control, the approach can be plagued by hunting, sticking, or slow or excessive windup action when attempting to achieve narrow tolerances.

Further improvements may be made by compensating for certain forces of the system, if those forces can be predicted. Feeding signals based on inputs directly into the system without basing those signals on output measurements is called feedforward control. Feedforward can augment feedback control by approximately matching or compensating for known forces. The challenge is that friction forces are difficult to predict accurately. Several different parameters are needed to define high-fidelity friction models. These parameters are used to represent sticking behaviors, sliding behaviors, displacement conditions, contact stiffness, energy dissipation, shearing actions, and the like. It can be appreciated by one of skill in the art that accurately modeling the multifaceted effects of friction can be a complicated undertaking.

The development of models that account for the nonlinear effects of friction is a complex undertaking because of the many physical mechanisms that combine to create friction forces. Nonetheless, recent advances in friction modeling have improved the fidelity and range of prediction of friction. In fact, friction has been shown to be much more repeatable than previously thought. However identifying the several parameters needed for the new models is not a trivial exercise.

Even if the friction behaviors are well understood and modeled, a system designer is still faced with the task of designing a controller that can estimate all the system states needed in order to use a high-fidelity friction model that accurately predicts the highly variable, multifaceted behavior of friction. The behavior and nonlinearity of friction can be especially pronounced when small movements or low velocities are required in a given system—the region of operation where most precise control must occur.

Some of the common control problems that are related to friction include steady-state errors, limit cycles, and stick-slip behavior. Steady state errors often occur, for example, when the control effort is in some way proportional to the control error. In this case as the process is driven closer to target, the control error is reduced. However, the control effort, which is proportional to the control error, is also reduced. At some point of the process, the control effort ceases to exceed the force of friction and the system decelerates to rest, often shy of the target or outside of tolerance.

Limit cycles can result from attempts to overcome the steady state error when integral control is added to the proportional control approach described above. The force from integral control builds up enough to overcome the force of friction. However, a system with integral control does not change its integrated value quickly. As a result, motion in the appropriate direction may be achieved, but the target is often overshot. The system then repeats the integral control process in the opposite direction, which results in the target being overshot in the opposite direction. This process can occur indefinitely.

Stick-slip behavior describes the condition that often occurs when making fine position adjustments. The force that is applied to a load in order to overcome the static friction also causes an acceleration of the load when the slip occurs. In other words, the force of friction drops suddenly to a kinetic value when the slip occurs and the force needed to overcome the initial static friction is not immediately extinguished causing an acceleration of the load. Stick-slip behavior can be problematic when small displacements or low velocities are required because friction force is especially dynamic when transitioning between stuck and sliding states that are typically associated with small movements.

The nonlinear effects of friction pose a great challenge to fine position control and improvements are needed in control systems and methods of performing control effort calculations to meet the demands for precise control with greater efficiency and speed.

Furthermore, a long standing challenge in the control field has been to develop methods that can accurately warn a system operator when maintenance will be needed so that maintenance can be scheduled before a failure occurs, thus minimizing costly unscheduled downtimes.

BRIEF DESCRIPTION OF THE DRAWINGS

To further clarify the advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the present invention pertain to systems and methods that control the output of machines, devices, and processes. Embodiments of the invention also extend to systems and methods for monitoring aspects of equipment health or processes that are being controlled. Embodiments of the invention herein may be referred to as adaptive Mapping of device output Change to amounts of Control Effort (MC2E).

A specific implementation of MC2E may be referred to herein as Adaptive Impulse Control (AIC) where the change of output is a position, and the applied amount of control effort takes the form of a pulse. MC2E refers to the more general invention, with AIC being a particular example.

Embodiments of the invention precisely control the output of a system. The invention is particularly applicable to systems in which system physics result in relationships between applied control effort and resulting output change that are intrinsically nonlinear and possibly time-varying.

The invention provides a way of recording, tuning, and monitoring a nonlinear relationship between an amount of control effort input and the resulting output change of the device to which the effort is applied. In general, the relationship is not one of strict proportionality or linear, but can be highly nonlinear especially when a broad range of operating conditions is to be covered.

The relationship between a desired amount of output change and the control effort required to cause that change is mapped by the invention using a finite set of points. In general, each point is defined as an ordered N-tuple where N is a positive integer greater than or equal to two, one element of the N-tuple being indicative of an amount of device output change, another element of the N-tuple being indicative of an amount of control effort, and N−2 additional elements of the N-tuple being indicative of system state prior to application of an amount of control effort.

Figure 7:
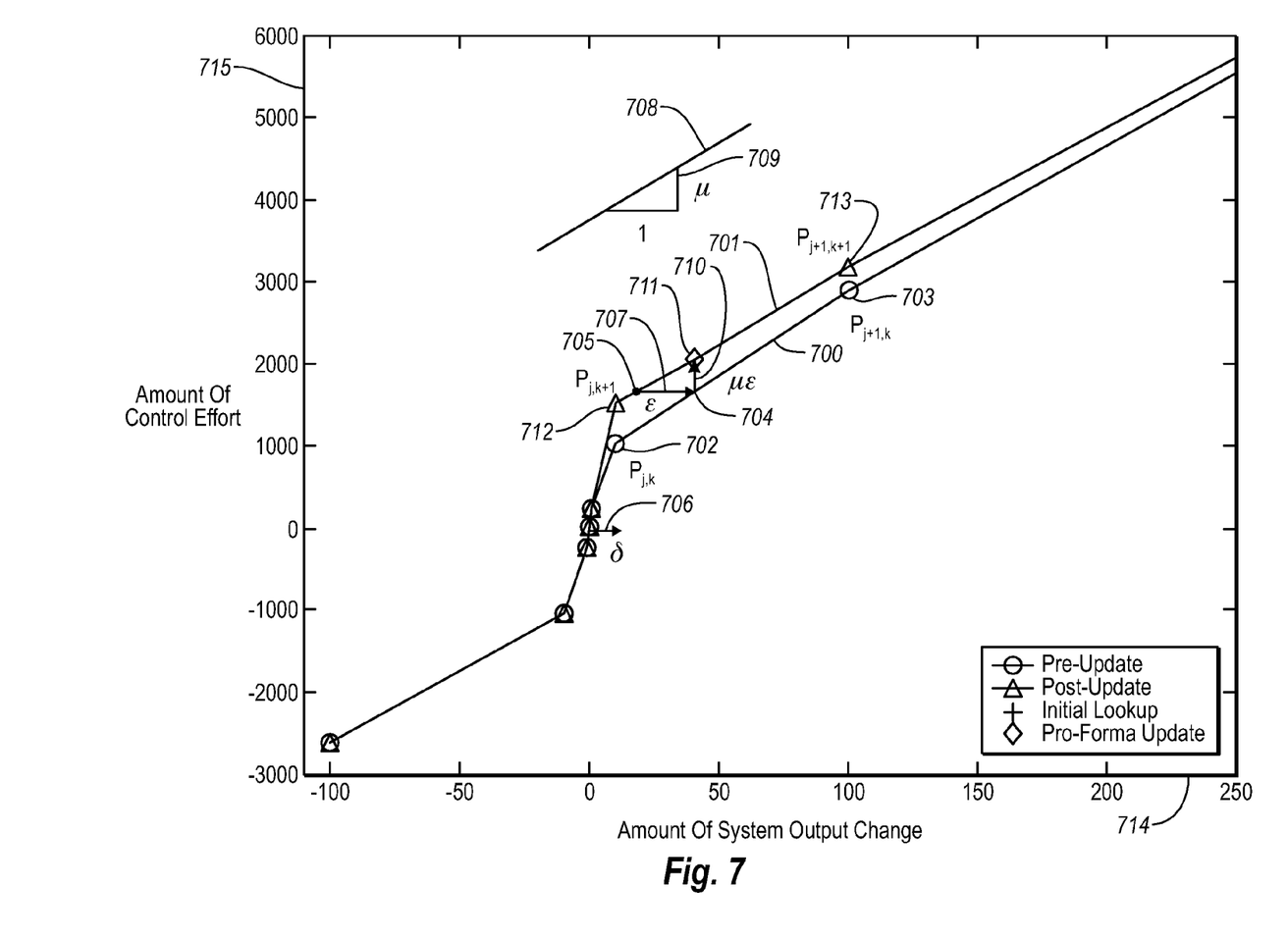
FIG. 7 illustrates an exemplary control map relating amounts of output change to amounts of control effort and also illustrates an exemplary control map after applying an exemplary 2-point update.

The simple case of N=2 may pertain to a single input, single output system. An example of a map for N=2 wherein the points are logarithmically spaced with respect to the magnitude of change of output is shown in FIG. 7. In this illustrative case, the amount of change of output is shown against the horizontal axis 714, and the required amount of control effort required to effect such a change is shown against the vertical axis 715. An example of a change in output could be a change of position in the controlled element of the system. An example of an amount of control effort needed to cause such a change of position may be measured in terms of the width or duration of a fixed amplitude pulse or by some other measure of control effort, impulsive or non-impulsive, that is applied over an interval associated with a control event. The points of the map shown here are spaced non-uniformly with respect to change of output in order to efficiently cover a wide operating range while maintaining high resolution for small values of displacement. Each point in the map affects a different range of output change.

As previously indicated, conventional control systems rely on friction models that predict the effect of friction while attempting to precisely control the position of a load. This use of friction models can consume system resources and is not always satisfactory. The models, for example, may not account for some of the changes, such as wear, that can occur in systems over time. Conventional models may not always be applicable over a wide range of motion. Embodiments of the invention include adaptive impulse control that focus on the end results of the control system to achieve precision control. Further, the control achieved by embodiments of the invention can adapt automatically to changes in the system. Control systems and methods also adapt in response to the actual forces of friction experienced in the system.

Embodiments of the invention provide many contributions to control and monitoring, particularly in nonlinear systems. For example, the application of adaptive impulse control as a particular instance of MC2E improves performance on positioning machines without hardware modifications. Compared to conventional methods, embodiments of the invention can improve mean settling time performance over a wide operating range through a more accurate, adaptive fit to the nonlinear relationship between pulses and displacements.

Embodiments of MC2E disclosed herein can meet or exceed standards established by conventional methods. For example, a tested instance of MC2E where output is position and the control effort take the form of variable duration pulses consistently achieved zero tolerance position control, within the measurement capability of the given test equipment, for all commanded movements.

Embodiments of the invention, particularly adaptive impulse control relying on the MC2E adaptive mapping, produced superior settling time, transient, and tracking characteristics compared to other known methods, especially from a cold start. In one example, a three fold reduction in the number of pulses needed to follow a repetitive trajectory with zero tolerance precision was obtained.

MC2E methods for automatically tuning the log-spaced control parameters are within the scope of the invention. In one example, the update mechanism is related to particular parameters, such that only those parameters that used to calculate control effort for given amount of output change are the parameters that are updated in any given iteration. Advantageously, this enables local optimization of the control map without forcing parameters unrelated to a given displacement range to be affected. In addition, adaptive gain can be specific to each parameter in some embodiments. For instance, the parameter updates depend on a learning gain, a local estimate of pulse sensitivity, and the residual error following each pulse.

Figure 1:
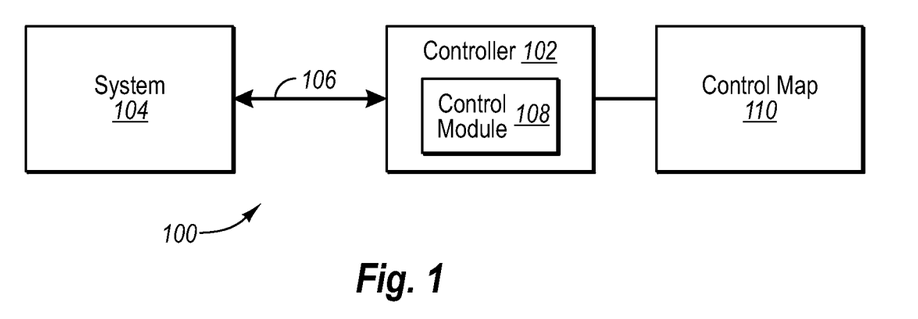
FIG. 1 illustrates an exemplary environment for implementing embodiments of the invention.
Figure 2:
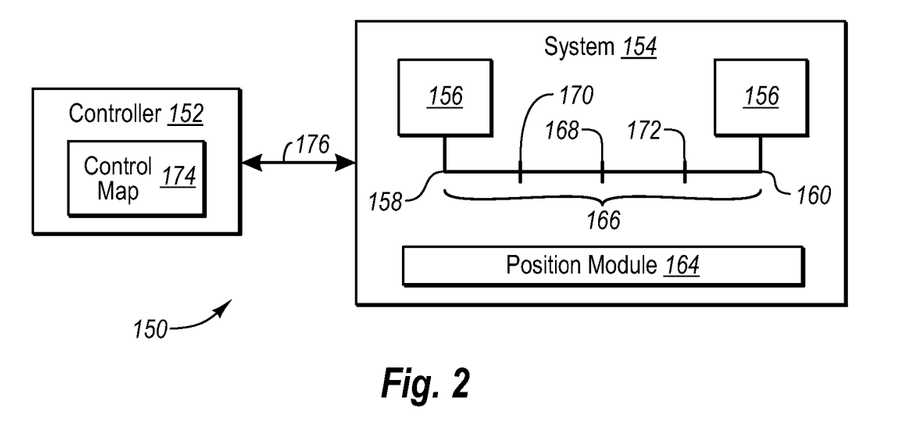
FIG. 2 is an exemplary block diagram that illustrates a controller used to precisely control the position of a load of a system.

FIGS. 1 and 2 are intended to be illustrative of multiple systems that may require a precision control system or of environments in which embodiments of the invention may be implemented. FIG. 1 illustrates an example of an environment 100 that includes a system 104 that interfaces with a controller 102. The controller may include a control module 108 that is used to provide precision control to the system 104. In this example, the controller 110 may include or have access to a control map 110. The control map 110 may include data that is used to identify or select the pulse or other force or effort needed to achieve a displacement or change in output. The control map 110 can be stored in memory and may be integrated with the controller 102 or remote from the controller 102.

The control signals 106 delivered to the system 104 in a variety of manners. The controller 102 can be directly connected with the system 104, for example. Thus the connection can be hard wired. In other examples, the connection can be wireless. This can enable remote precision control of certain systems. In this case, the system 106 and the controller 102 are provided with hardware and software needed to coordinate the position commands generated by the controller 102. The controller 102, in a similar manner, is able to receive position measurements from the system 104 that enable the control map 110 to be updated in some embodiments. Furthermore the controller 102 may be connected to the system 104 indirectly by filters, amplifiers, pilot valves, or other intermediate control stages with or without inner feedback control. Such intermediate devices or stages may be assumed to be part of the controller 102 or the system 104 with loss of generality.

Examples of such systems 104 that can benefit from a precision control system include, by way of example and not limitation, systems for positioning heads in disk drives, positioning lasers in optical drives, control the position of control valves (opening, closing, partially opening) in fluid control applications, the control of machining equipment, motor control, revolution control, and the like. Embodiments of the invention can therefore be implemented in computer systems, semiconductor fabrication processes, process control, manufacturing processes, and the like. One of skill in the art, with the benefit of the present disclosure, can appreciate the applicability of embodiments of the invention to other systems where precision control is beneficial.

FIG. 2 illustrates a more detailed example of precision control. FIG. 2 illustrates a control system 150 that includes a controller 152, which may be one embodiment of the controller 102. The controller 152 may use a control map 174 to provide precision control. Although FIG. 2 illustrates the control map 174 as part of the controller and the position module 164 as included in the system 154, these modules can both be in the controller 150, part of the system 154, or remotely accessed. Further, the controller 152 can interface with the system 154 or be an integral part of the system 154.

In this example, the controller 152 interacts with a system 154 over a connection 176. The system 154 includes a load 156 that has a range of movement 166. The precision movement of the load 156 over the range of movement 166 is controlled by the controller 152. The position module 164 samples the position of the load 156 repeatedly or when directed and reports the position of the load 156 to the controller 152. The position module 164 can be used to identify the starting position of the load 156 as well as the ending position of the load 156. The movement of the load 156 can also be sampled repeatedly.

In the system 154, the range of movement 166 is typically determined by the system itself. For example, a valve can typically operate in a range of movement that is bounded by a completely open position and a completely closed position. A gear, in contrast, can be rotated continually. Thus, the range of movement 166 can be measured radially and/or in terms of revolutions or partial revolutions. Thus, embodiments of the invention contemplate multiple types of ranges of movement. The starting and ending position of the load 156 can be anywhere in the range of motion 166. When the controller 152 issues, causes, or generates displacement in the load 156, the starting position from which that specific displacement begins may be the current position of the load 156.

If the load 156, for example, is located at position 170 at the beginning of the displacement, then the position 170 may be the starting position. The target position is the intended destination of the load 156 for the specified displacement. Therefore, if the controller intends to move the load 156 to the location 172, then the target position 172 should be the ending position. The actual ending position, however, becomes the starting position for the next displacement.

The initial pulse applied to a load 156 may result in a post-pulse error that is outside of an acceptable tolerance. For instance, the ending position is not sufficiently within tolerance of the target position. If this is the case, then subsequent pulses are applied until the ending position of the load 156 is within a specified tolerance of the target position. The movement of the load 156 can also be in various directions, depending on the arrangement of the system 154. The load 156, for example, can move forwards and backwards or rotationally or any combination thereof. Multidimensional systems are also contemplated by embodiments of the invention.

Typically, displacement of the load 156 is achieved when the controller 152 generates a pulse. For example, if the controller 152 includes or controls a motor that is driving a rotational displacement, a pulse may be applied to the motor. The pulse displaces the load 156 some distance or by some angular displacement to an ending position. Often, the actual ending position is different from the target position of the pulse. The difference between the ending position of the load 156 and the target position is referred to as error. This displacement error can be measured by the controller 152 and used to update the means by which the pulse is generated. As a result, the controller 152 can adapt to the dynamics of the system 154 and generate pulses that more precisely displace the load 156. Thus, the controller 152 can adapt to the nuances of the system 154.

For example, assume that the system 154 includes multiple valves that are moved back and forth between various positions that include fully opened, fully closed, and anywhere in between. If the controller is controlling the pulses that are applied to each valve, the controller 152 can adapt the applied pulses to the nuances of each valve independently. Thus, even if both valves are being moved the same displacement (i.e., from a fully open position to ¼ open position), the controller 152 may apply different pulses to the valves while achieving the same displacement. In some instances, a control map may be maintained for each valve as the forces that affect displacement can vary from one valve to the next. Further, the control maps can be updated over time to account for these and other differences.

Embodiments of the invention in the form of adaptive impulse control can be used in many environments where precision control, displacement control, or precision movement is needed. Advantageously, certain embodiments very effectively compensate for nonlinear effects of friction, but do so without the need for an explicit friction model. The elimination of the requirement to directly model friction can reduce the design and manufacturing cost of the controller while producing superior results. Embodiments of the invention focus on the actual control effort needed to overcome the total effects of friction for a given change in the system's output with less concern for the instantaneous forces that must be estimated by conventional feedforward techniques. The resulting controller is thus cost effective and efficient.

As previously described, friction is multi-faceted. The force of friction depends, among other things, on velocity, displacement, acceleration, and path. Temperature and position dependence are also important factors influencing the friction force. Therefore, calculating the control effort required to move from one point to the next in mechanical systems can be complex and depend on many variables. But small displacements have been produced with repeatability using impulsive control calculated based on MC2E mapping methods as disclosed herein. The impulsive control approach can be simplified to the calculation of single pulse per positioning event without requiring the measurement or estimation of intra-pulse velocity or acceleration.

To control position over a wide range of displacements, pulses may be varied as a function of desired step size. The relationship between pulse duration and step size is seldom a simple function. A controller that automatically identifies this relationship through online learning is desirable. To map the complex relationship between pulses and displacements for both fine and coarse moves, Adaptive Impulse Control can automatically tune a set of control parameters. Each control parameter may be a pulse value expected to produce a given displacement.

An actuator should supply enough force to overcome friction, accelerate the system, and sustain motion until the system output reaches the coast down or braking distance to the target. Impulsive control has some advantages over conventional control when precise positioning is required.

Conventional control calculates force commands based on measured or estimated states. If the sample time or time constants of the estimator are large compared to the optimal switching times needed to move short distances, then conventional control may not be able to reverse or zero the control effort soon enough to achieve precise control. An impulsive controller can calculate the pulses before motion begins based on stable measured states. A pulse generator that produces a single pulse with very fine timing resolution is often much less expensive to build than a complete measurement and control system capable of achieving the same timing. Furthermore, the impulsive control problem can be simplified to making a single pulse duration calculation per positioning event without requiring measurement or estimation of intra-pulse velocity. At that point, the actuator force can be shut off or reversed and the kinetic energy will be dissipated. If actuator force is switched at the proper time, the system will stop precisely on target. In each of these, conditions of pre-sliding motion, acceleration, steady motion, and deceleration, friction plays a critical role. But the MC2E mapping method provides an excellent means for handling the calculation of control effort across such transitions and within each friction regime.

The spacing of mapped changes in system output is typically fixed on start-up. An example of a baseline map 700 is shown in FIG. 7. The pulse value expected to cause each displacement may be learned either by a short training exercise and/or by ongoing updates that progressively refine the parameters. To apply pulses for displacements not stored in the control map, the nearest stored values can be interpolated. After the interpolated pulse is applied, if the system did not move exactly by the desired displacement, an optional update may be performed. The update 710 attempts to correct only those specific pulse parameters 702 and 703 that were used to interpolate the most recently applied pulse. In this way, pulse parameters are independently optimized without sacrificing the tuning of its neighbors.

When the stored relationship converges 701 to the actual relationship of the machine, each pulse applied to the system will be accurate. Usually the relationship is not known in advance and has to be learned through online trials. When each pulse is accurate, one or few pulses will be needed to reach each desired destination. When fewer pulses are needed, settling time is improved and efficiency is increased. While convergence of the control parameters may never be perfect due to unmodeled dynamics, unmeasured or unestimated states, imperfect interpolations, and disturbances, AIC can often do better in fitting arbitrary nonlinear relationships between pulses and displacements over a wide operating range than pre-existing methods. Pre-existing pulse width control methods often rely on tuning a single parameter or use a pair of line segments to define the control law related desired displacements to the pulses that are expected to cause them.

During initialization, a fixed set of log-spaced displacements are chosen for which pulse values are to be learned. By using log-spacing, a wide range of displacements can be covered for both fine and coarse displacements.

Figure 3:
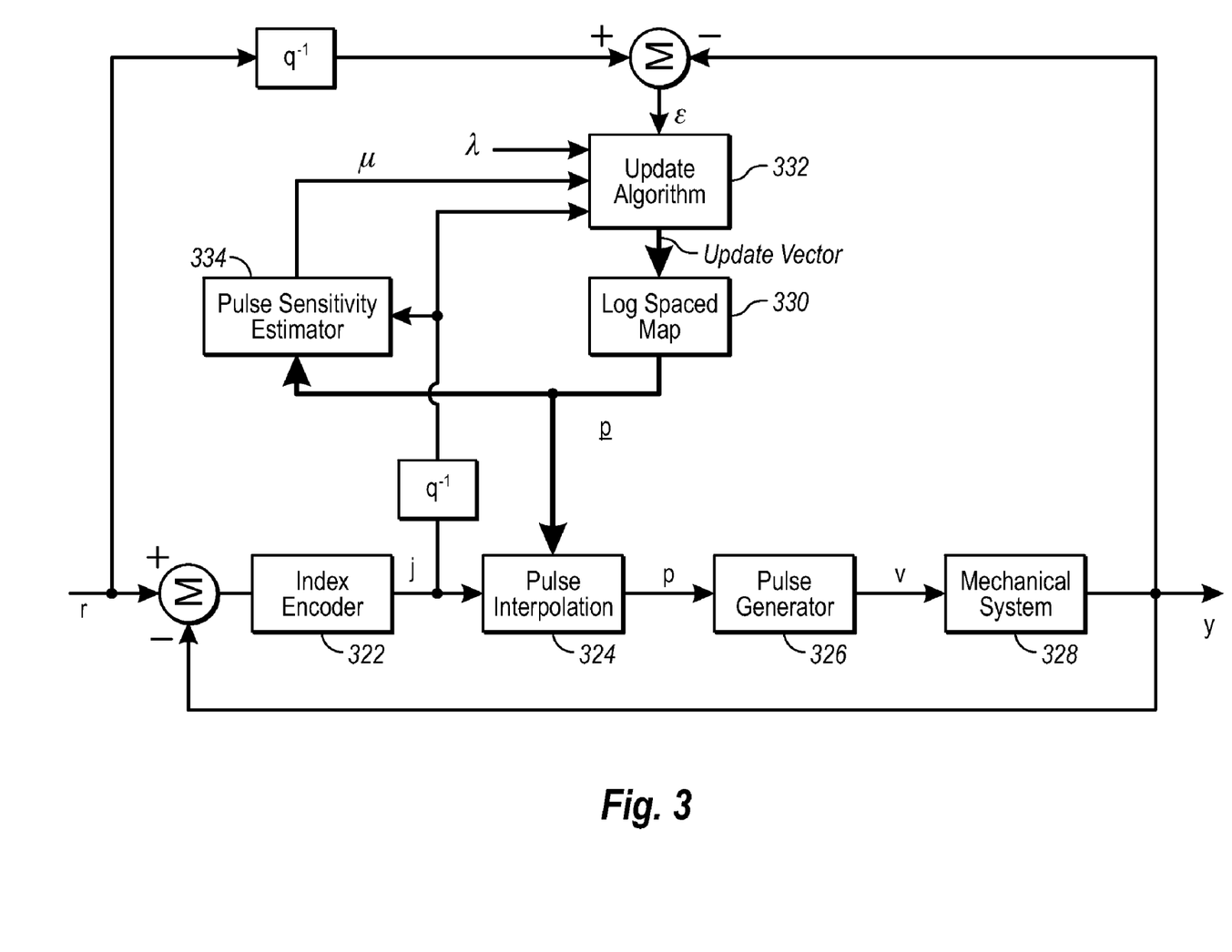
FIG. 3 illustrates an exemplary illustration of adaptive impulse control.

FIG. 3 shows an overall block diagram of the AIC method. A reference position "r" is provided by the user or a supervisory program to the input of the AIC controller. Control error "e" is calculated in the usual fashion as the difference between the reference r and the output "y". The control error is used to derive an index value "j" that locates the pulse information in the control map 330 (which may be a log-spaced map) that most nearly matches the desired output change equal to the error e. A pulse interpolation algorithm 324 may then calculate a scalar control effort or pulse command "p" to cause a displacement e. This pulse command may be sent to a pulse generator 326 that generates a single rectangular pulse, by way of example only (or other appropriate waveform) of amplitude vp=sgn(p)Vsat and duration tp=|p|, where Vsat is a constant.

The generated pulse generally causes motion in the system 328. Friction inherent in the system may provide braking. Braking may also result from a dynamic braking effect when motor terminal voltage is again forced to zero in a system that employs a voltage amplifier to drive a direct current fixed-field motor. Each pulse can therefore cause the system to step from one position to the next with a displacement that depends on the size of the pulse. If the calculation of the pulse is correct, then the system will move exactly to the reference position r in a single step. When the calculation of the pulse is not ideal, the system should still move closer to target so long as the initialization of the stored parameters is reasonable. By repeating the process, multiple pulses can be used, each progressively reducing the position error until the positioning tolerance is met.

Due to the multi-faceted nature of friction in combination with actuator saturation, the relationship between system output change and applied amounts of control effort that cause them is, in general, a nonlinear relationship. By virtue of assigning a different parameter to each range of output change, a simple alternative to the normally difficult challenge of writing a single control law equation can be applied globally. The amount of energy injected to the system during each new positioning event should be precisely calculated, in one embodiment, to avoid unnecessary overshoot or undershoot.

After a pulse is applied, the system settles on a new position, so long as the applied pulse was long enough to cause motion. Some residual position error, £, is likely to remain after the pulse. Residual error measures the distance by which the last pulse missed its intended displacement. If pulses are not producing their intended displacements, then the residual error c 707 should be used to correct the pulse parameters stored in the control map.

One of the advantages of the Mapping output Change to Control Effort (MC2E) method is its capacity to correct only those specific pulse parameters that have affected the calculation of the last pulse. Pulse parameters can be optimized independently, if desired, without sacrificing the tuning of their relatively distant neighbors. The first step in the update is to locate (or recall) the stored pulse parameters that were responsible for generating the most recent pulse. AIC calculates a single decimal index value j for this purpose. The integer values of j and j+1 point to the left and right bracketing parameters used to generate a pulse. The fractional part of j gives the interpolation fraction. The delay operator q−1 is shown in FIG. 3 to indicate that a one control iteration delay on the index value may be used in making the update. The update 332 is calculated after each pulse is applied (conceptually at the beginning of the next pulse) and therefore should be applied to the parameters used one step ago. The idea is that updates should apply specifically to the parameters that are responsible for a particular residual error.

Embodiments of the invention can determine how much a pulse should change to produce a differential unit of displacement This can be referred to as the sensitivity of the system or the pulse sensitivity which is defined as $$\mu(d) = \frac{\partial p}{\partial d}.$$

Since the control map 330 (or more detailed view of the same 700 in one embodiment) maintains the most recent estimates of how pulses are related to given displacements, the pulse sensitivity estimator 334 can numerically or otherwise estimate the pulse sensitivity as a function of displacement based on the stored map values. One way to estimate the sensitivity for a single input, single output system is to determine the slope 708 for map 700 at the point of initial lookup 704.

Knowing the residual error 707 and the knowing sensitivity 709 of the system together provide the information necessary to estimate a map correction that is most likely to reduce residual error to zero on like future control events. That update is the product με (710). When on-line learning is enabled, this update is distributed with some weighting among the pulse parameters in the control map 700.

The weighting divides the update in some fashion among points near the original lookup 704. A 1-point update can simply apply the entire update to the nearest neighbor. A 2-point update can divide the update equally among the two nearest neighbors, or it can divide the update unequally with the most weight on the point closest to the original lookup point. (A particularly effective 2-point update is shown in the update subroutine of the example pseudo-code included below.) An M-point update can update M points at once where M is the number of points to be updated. The number M can be an integer from zero up to the total number of points in the map. If M is equal to the total number of points in the map, the update can be referred to as a global update.

In one embodiment, an update vector $u_k$ is produced that communicates information from an update algorithm 332 to an instance of a log-spaced map (330 or more specifically 700). For a two point update, this vector has two non-zero elements whose indices correspond the pulse parameters that are to be corrected. The correction is applied as $p_{k+1}=p_k+u_k$. FIG. 7 shows an example of points before an update (702 and 703) and after an update (712 and 713). In practice, a learning parameter λ is also applied to throttle the learning. If the residual error associated with the last pulse were the result of a random disturbance or measurement noise, rather than a poorly tuned control map, then a more conservative correction may be desirable. A throttled correction is λμε where λ is in [0,1]. When λ is close to zero, the parameters learned in the past are not so quickly forgotten.

The initialization of the control map or control table (such as the control table 174 in FIG. 2) includes providing a set of displacement values. The control table typically associates displacements with pulse values.

The control effort values are, in one embodiment, indexed by two variables, with regularly spacing on starting position (614,616,618) and log-spacing on displacement 606. (See FIG. 6.) In this way, system conditions that vary with initial conditions, such as the variable compression of a pre-loaded return spring in a process control value with respect to starting position, can be accurately compensated for. Techniques of multi-dimensional interpolation are well known, an example being bilinear interpolation for the two input case.

Embodiments of the invention can improve stability of the control process. Before actually distributing the throttled correction into the control map, constraints for guaranteeing stability can be applied. In one example, stability constraints are applied to pulse interpolation in the main loop and to pulse updates made by the adaptive algorithm.

When a system is initiated, ideal pulse or control effort values are typically not yet known. In fact, there is no strict requirement to provide initial control effort map values as the pulse values in control table can be generated based on trial responses from the actual system during an optional training exercise. Alternatively, the pulse values can be seeded using historical pulse values, expected pulse values, or model based analyses.

Figure 4:
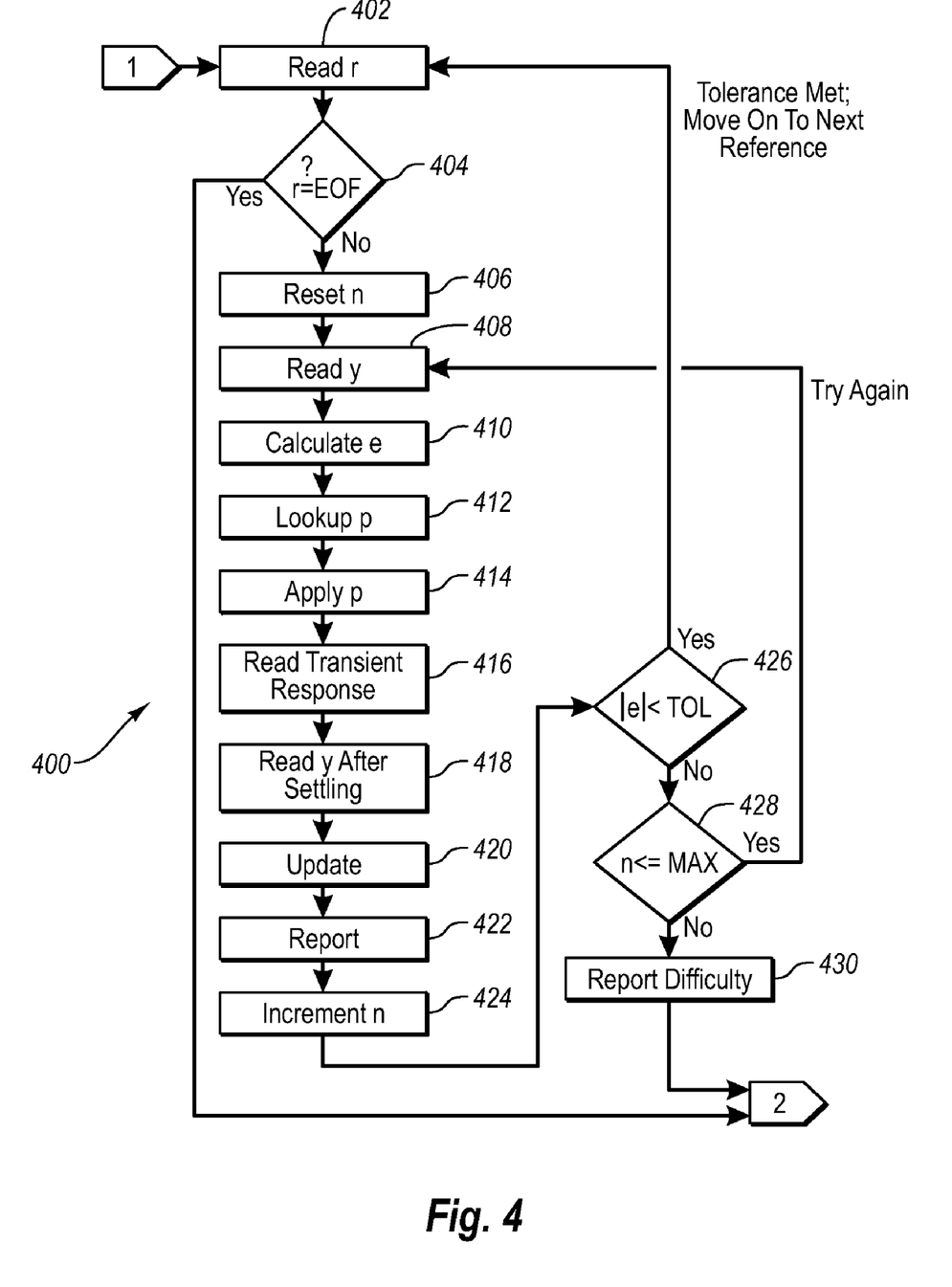
FIG. 4 illustrates an exemplary routine for precisely positioning a load in a system.

After completing the initialization routine, which may have already been performed for a given system, the main routine illustrated in FIG. 4 may be executed. The main routine typically begins by reading 402 a reference value (variable r). The reference value corresponds to a desired displacement for the load. Reference values can be sent to the controller either from an external supervisory process, through a keyboard, or by reading a file that specifies a desired trajectory. If the reference reaches the end of file 404 or reads an end of file escape sequence, no pulses are generated and the main routine ends.

After the starting position is measured, an initial error is calculated 410. Some optional steps may be performed between reading the reference value or position and calculating the error, such as illustrated in FIG. 4. The initial error represents the difference between the reference (or target position) and the starting position. Once the initial error is determined, the pulse value is looked up 412 or generated from the control map or table (700 for example). The pulse value needed to move the system to the reference or target position preferably produces a displacement to the load that, in a single step, eliminates the control error. The pulse value preferably produces a displacement from the starting position such that the displacement is equal to the calculated error (410). In other words, the first pulse in a given control event generates sufficient energy or effort to overcome friction or other forces, accelerate or otherwise change the state of the system such that the system output coasts, changes, or arrives at the desired system output state shortly after the pulse ends, or shortly after the mapped amount of control effort has been applied.

The amount of control effort may be an absolute or differential amount. For example, when controlling the arm of a robot, a force of gravity may demand a steady amount of motor torque be applied in order to balance the gravitational force and keep an arm stationary. The mapping of an amount of output change to an amount of control effort could then refer to a differential amount of control effort to be added by superposition to the steady control effort balancing the gravitational force. Similarly, in a process control valve, a fail safe spring may be present in the system. To hold the valve in a given position, a steady differential pressure across an actuator's piston or diaphragm can be required. One control loop may be applied to hold the valve in position by producing a steady differential pressure, and another control loop or method such as MC2E or specifically AIC can generate short bursts of control effort to be added by superposition to the first, for example.

In one embodiment, the interpolation used to read amounts of effort from the control map is a method referred to as log-log interpolation. In this example, the abscissa value x for which an ordinate value is to be found by interpolation is read. The bracketing left and right index values are then found. These bracketing values will often be the nearest mapped abscissa values to the desired abscissa for which an ordinate value is to be found. Next, the logarithm of absolute values of each abscissa and ordinate values is computed as in: $X=\log_b(|x|)$. Next, linearly interpolate on the transformed values to find Y. Next, compute the inverse transform to find the interpolated answer or control value z in non-transformed space by raising the logarithm base 'b' by the power of the transformed interpolant Z and then re-apply the sign, here referred to as sgn(.) of the nearest original mapped ordinate, where sgn(.)=−1 if the nearest original mapped ordinate was negative, and sgn(.)=1 if the nearest original mapped ordinate was positive such that $z=b^Z*\text{sgn}(.)$ For special cases where any of the original values are zero, or if the nearest ordinate values involve a sign change, the default can be to linearly interpolation on the original data without any intermediate transformations. This paragraph describes one particularly effective method for looking up pulse values from a control map spanning a large range with a few points.

After the pulse value is determined from the control table, the pulse is applied 414 to the system. Here, a rectangular pulse is applied, but one of skill in the art can appreciate the use of other pulses. The pulse can be modified at least in terms of duration, amplitude, and/or waveshape. When a rectangular pulse is applied, the amplitude depends on the sign of the pulse value. A positive value implies forward motion and a negative value implies reverse motion.

For optional settling time or dynamic system analysis or, a transient may be read 416. This step is suited for research and analysis, and may be omitted for typical applications. After the system has settled, the ending position is read 418. To detect the end of motion associated with a particular pulse, one embodiment of the invention uses a moving sample window. When the samples cease to change across the window, the arrival to a rest state can be assumed and the ending state for the given control event can be read. The window size is tailored to accommodate any pertinent dynamic effects that may inherent to the dynamics of the system being controlled.

After an ending position is identified, the main routine can optionally update 420 the control table. Updating the control table enables the system to tune the control table and increases the likelihood that the target position will be reached with a single pulse for subsequent displacements that start from like conditions as those of the immediately previous event. The ability to update the control table is advantageous, for example, because the system characteristics may vary with time. Wear, load changes, and the like can change and have an impact on the pulse needed to achieve a given displacement. Enabling updates to the control table allows the system to adapt to changing system parameters and ensure that the appropriate pulse is applied for a given displacement. It should also be noted, that even when updates are not enabled, excellent control performance can still be obtained so long as the map's initialization approximately matches the characteristics of the system. In this case, a few additional iterations may be needed in order to reach each new target position, but several iterations can often be performed quickly in comparison to conventional control techniques.

The update can be defined in terms of a pulse sensitivity and the error. The error is the displacement remaining between the ending position and the target position. The pulse sensitivity, which may be a partial derivative of the pulse with respect to displacement, gives an indication of how much a pulse value must change in order to effect a different amount of displacement. The pulse sensitivity depends on displacement because the pulse has a nonlinear relationship with displacement and can be estimated from the map itself.

In one embodiment, the update could be applied at a displacement in the control table that corresponds to the pulse value interpolated during the pulse lookup process, even though this exact displacement value may not appear in the control table. Alternatively, the update can be distributed among the multiple points or displacements in the control table.

In one embodiment, the distribution of the update to the control table or to the control map is to apply the entire update to the nearest control point. In another example, all points in the control table are amplified or attenuated by a common factor. In another example, two points in the control table are updated. In other words, the update can be distributed between two points. The update can be evenly spread between the two points or distributed using a weighting factor.

Updating the control table can be performed as follows in one embodiment. As described previously, for example, in order to gain and maintain optimal tuning of the control table or control map, an optional update is applied to the control table at the end of every pulse response. If pulses are not creating the desired displacements, the control table can be improved.

Updating can begin, for example with an update of the form $p_{\gamma,k+1} p_{\gamma,k} + \lambda Y$. as if this update could be applied anywhere on an interpolated control curve. The 'γ' subscript implies the interpolated virtual position in the control table at which the displacement would exactly equal the error at beginning of the control iteration, $d=e_i$. $\lambda$ is a unit-less adaptation rate, while Y is defined as a pro-form a update in microseconds as the produce of two terms: Y defined as $\mu e_f$ where $e_f$ is the residual error defined as the difference between the desired output and the output of the system as measured after the control effort has been applied and any transient has decayed. $\mu$ is the pulse sensitivity $$\mu(d) = \frac{\partial p}{\partial d}$$

which can be estimated numerically if necessary from the control map.

The pulse sensitivity gives an indication of how much a pulse value must change in order to effect a different amount of displacement. This sensitivity depends on displacement since $p=p(d, \ldots)$ is in general nonlinear. The relationship between pulse values and displacement is especially nonlinear in the transition between stick-slip and sliding motion in position control systems. Often an estimate of $\mu$ will be estimated at a control error associated with the last pulse, as in $$\hat{\mu}(e_{i,k}) \approx \frac{\partial p}{\partial d}\bigg|_{d=e_{i,k}}.$$

After the update is applied to the control map or table, the main routine reports 422 the data. Each report can include various parameters that may include, but are not limited to, reference position, starting position, starting error, pulse, ending error, settling time, and the like or any combination thereof that may be useful to the system operator.

The routine then increments 424 the counter. Next, a determination is made as to whether the ending error is within tolerance 426. If within the specified tolerance, the method proceeds to either wait or to read 402 the next reference value.

If the error not within tolerance and the counter (n) is less than some maximum 428, then the ending position becomes the starting position 408, a new error is calculated 410, a new pulse value is looked up 412 and applied 414. In other words, additional pulses are applied until the ending position is within some tolerance of the specified reference or target position. Determining whether the number of pulses (n) exceeds some maximum 428 can help ensure that the system does not enter an unending state. If the maximum number of pulses is exceeded, the difficulty is reported 430.

If the ending position of the load after the pulse is within tolerance of the target position, then the system waits for the next command. Otherwise, this process is repeated and another typically smaller pulse is applied to move the load closer to the target position. This process is repeated until the object is within tolerance of the target position or until the number of attempts has been exceeded.

During this process, the control table can be updated with the results of the pulses as described above. Over time, the number of pulses required to move a load from a starting position to a target position decreases as the pulse values in the control table are updated over time as the controller is used.

Figure 5:
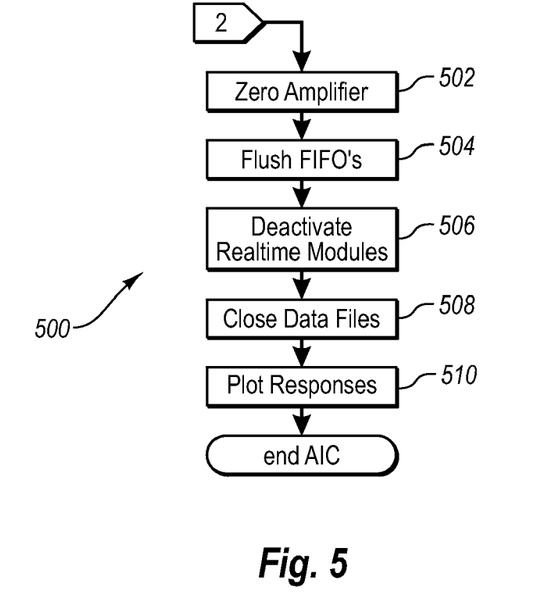
FIG. 5 is an exemplary flow diagram of a terminating routine.

FIG. 5 illustrates a shutdown routine 500. The shutdown routine 500 begins by zeroing 502 an amplifier to promote safe shutdown conditions. Next, the routine flushes 504 the FIFOs to free kernel memory, if such were used for analysis or recording purposes. Also, as part of the shutdown process, realtime modules may be deactivated 506, opened data files may be closed 508, and results may be graphically plotted 510, for example.

Embodiments of the invention also contemplate multi-rate learning. For example, the forces that impact a system when moving a load a relatively large distance can differ from the forces that are relevant to moving a load a short distance. The relationship between pulses and displacements may be nonlinear. As the control table is updated, the pulse values for the relatively large distances may converge to optimum values at a rate that is different for the pulse values required for relatively short distances.

Embodiments of the invention also contemplate the use of multiple pulses. These pulses can be applied in the same direction or they can be opposing pulses. For example, a braking pulse may be applied after a forward pulse is applied.

As previously mentioned, the control table may have multiple dimensions. As described above, one of the dimensions is the displacement value. Another dimension may be the starting position. The starting position can be anywhere in the range of movement of the system. However, the pulse needed to achieve a particular displacement may be affected by the starting position of the load.

Figure 6:
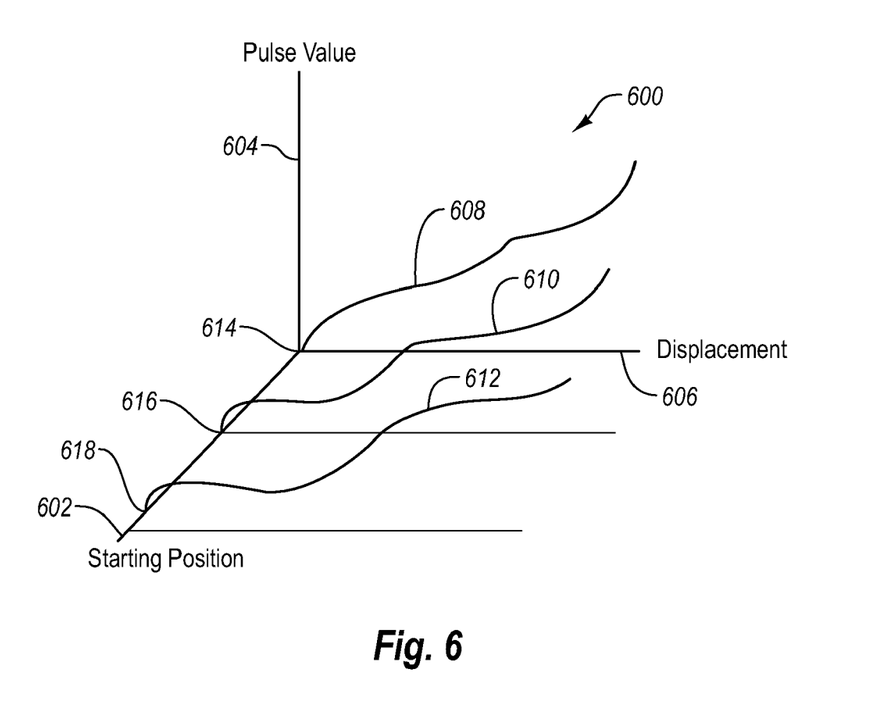
FIG. 6 illustrates an exemplary plot illustrating additional dimensions of the control table including the starting position.

FIG. 6 illustrates this potential dimension of the control table. The plot 600 illustrates one embodiment of a control table that accounts for the starting position. In this case, the axis 606 represents displacement, the axis 604 represents pulse value, and the axis 602 represents starting position. The curve 608 can identify pulse values for a specified displacement when the starting position is position 614. Similarly, the curves 610 and 612 can identify pulse values when the starting positions are position 616 and 618, respectively. In this example, the curves 608, 610, and 612 are similar, but differences can exist.

To estimate the pulse sensitivity (typically a nonlinear function), one effective method has been to maintain a moving or filtered regression or curve fit to the relation between the pulse value and the controlled variable, and analytically differentiate this function. A separate lookup table for sensitivity may also be used. But a simple polynomial curve fit updated with ongoing measurements has been is often adequate and practical.

Monitoring how points in the map drift with updates and passage of time can be useful in detecting equipment wear or changing operating conditions. The average drift velocity of each point in the map can be maintained with a moving average. A tolerance band about a baseline map can be established from experience or by statistical process control methods. Based on the mean velocity of each point (in units of control effort versus time) and the difference between the point's ordinate value and the particular edge of the tolerance band toward which the point is headed, a time at which a mapped point will exit the tolerance band can be estimated. By taking the minimum time of all the exit times, an estimate time of when the system will fail to operate within established limits can be estimated and reported to the system operator.

The following is an example of a working update subroutine to illustrate how pulse sensitivity or slope of the map may be dynamically estimated, the slope represented here as the scalar variable $mu:

```
sub update {
    my ($epsilon,$e,$mu,$psi,@index,$di,$xa,$xb,$xi,$dya,$dyb);
    my ($upsilon,$lambda,$sum,$num,$sp);
    $lambda=$throttle;
    $ef=shift;
    $e=shift;
    # calculate the interpolation variable xi
    (@index)=(0..$#dtab);
    $di=interp1(\@dtab,\@index,$e);
    $xa=int($di);$xb=$xa+1;
    $xi=$di-$xa;
    # calculate A
    $sum=0;$num=0;
    for (0..$#dtab){
        if( $dtab[$_] !=0 ){
            $sum+=abs($ptab[$_])/abs($dtab[$_])**$alpha;
            $num++;
        }
    }
    $A=$sum/$num;
    # calculate mu at slope point sp:
    #$sp=($e+$del)/2;
    $sp=$e;
    if($sp!=0) {$mu=$A/(2*(abs($sp))**$alpha)}
    else       {$mu=$A;}
    if(abs($sp)==0) {$mu=$A/2}
    # calculate upsilon
    $upsilon=$mu*$ef;
    $psi=$lambda*$upsilon;
    # calculate the two-point enhanced corrections
    $dya=$psi * (1 - $xi )/( 1 - 2*$xi + 2*$xi**2 );
    $dyb=$psi * (    $xi )/( 1 - 2*$xi + 2*$xi**2 );
    # apply the update
    $ptab[$xa]+=$dya;
    $ptab[$xb]+=$dyb;
}
```

Drift or sudden changes to table may anticipate need for maintenance or impending system failure. After initial tuning, a baseline of table values can be used as a reference. Once departures from the reference exceed a threshold warning indicators can be sent to the user or operator. Even during degradation of the system due to wear, lose of supply pressure, voltage, battery charge, etc, the invention may be able to extend operational life of the system by adapt to changing operating conditions while at the same time provide key indicators to system health.

The following example is another illustration of parts of a working implementation. Here, an example of an overall control loop can be seen which employs a 2-point update and log-log interpolation:

```
# begin main
{
    &initialize_settings;
    &load_modules;
    &open_fifos;
    &initialize_table;
    &open_data_files;
    # do one dry run to record the starting conditions
    $_=&read_position;
    $n=0;
    do{
        # get ref's from standard input (keyboard or file)
        # extract digits preceded by optional minus sign
        if(($r)=/(-?\d+)/){
            print "\n$terseheader";
            $n=1;
            $time=0;
            while(1){
                $yi=&read_position;
                $ei=$r-$yi;
                ($p)=int(&lookup_pulse($ei)+0.5);
                &apply_pulse($p);
                (@data)=&read_response;
                # eval yf only after full response has been read
                # to ensure settling
                $yf=&read_position;
                $ef=$r-$yf;
                $del=$yf-$yi;
                &update($ef,$ei);
                &report(@data);
                $n++;
                if(abs($ef)<=$tol){
                    last;
                }
                if($n>$max_tries){
                    print "hit $max_tries try limit\n";
                    last;
                }
            }
            print "\nnext reference? : ";
        }
    }while(<>);
    &zero_amplifier;
    print "exiting the present run...\n";
    &close_fifos;
    &unload_modules;
    &close_data_files;
}
# end main
sub lookup_pulse {
    my $d = shift;
    &interpll(\@dtab,\@ptab, $d);
}
sub interpll {
    my ($ia,$ix,$end,$p); # interpolation integers: low, fractional
    my $dtabref=shift;
    my $ptabref=shift;
    my $d=shift;
    my ($da,$db,$pa,$pb,$lda,$ldb,$lpa,$lpb,$ld,$lp);
    $end=$#$dtabref;
    # arrays start at zero and we are now seeking the left bracket
    for($ia=0;$ia<$end-1;$ia++){
        if($$dtabref[$ia+1]>$d){last;}
    }
    $da=$$dtabref[$ia];
    $db=$$dtabref[$ia+1];
    $pa=$$ptabref[$ia];
    $pb=$$ptabref[$ia+1];
    if( abs( $db-$da ) < 1e-100 ){
        print "insufficiently separated x data\n"; exit;
    }
    if( $da*$db<0 || $d*$da*$db*$pa*$pb==0 ){
        # interpolation on raw data
        $p=$pa+($d-$da)/($db-$da)*($pb-$pa);
    } else {
        $lda=log(abs($da));
        $ldb=log(abs($db));
        $lpa=log(abs($pa));
        $lpb=log(abs($pb));
        $ld =log(abs($d));
```

```
    $lp=$lpa+($ld-$lda)/($ldb-$lda)*($lpb-$lpa);
    $p=exp(1)**$lp;
    # reapply the sign. note we dont get here
    # if $pa and $pb differ in sign
    if($pa<0){
       $p=-1*$p;
    }
    $p=int($p+0.5);
  }
  $p;
}
sub apply_pulse {
  my $pw=shift;
  $pw=~s/(\d+)/$1/;
  # send pulse command to kernel
  syswrite(
     FW,
     pack('i',int($pw)),
     $sizeofcmdplate
  );
}
sub update {
  my ($epsilon,$e,$mu,$psi,@index,$di,$xa,$xb,$xi,$dya,$dyb);
  my ($upsilon,$lambda,$sum,$num,$sp);
  $lambda=$throttle;
  $ef=shift;
  $e=shift;
  # calculate the interpolation variable xi
  (@index)=(0..$#dtab);
  $di=interp1(\@dtab,\@index,$e);
  $xa=int($di);$xb=$xa+1;
  $xi=$di-$xa;
  # calculate A
  $sum=0;$num=0;
  for (0..$#dtab){
     if( $dtab[$_] != 0 ){
        $sum+=abs($ptab[$_])/abs($dtab[$_])**$alpha;
        $num++;
     }
  }
  $A=$sum/$num;
  # calculate mu at slope point sp:
  #$sp=($e+$del)/2;
  $sp=$e;
  if($sp!=0) {$mu=$A/(2*(abs($sp))**$alpha)}
  else      {$mu=$A;}
  if(abs($sp)==0) {$mu=$A/2}
  # calculate upsilon
  $upsilon=$mu*$ef;
  $psi=$lambda*$upsilon;
  # calculate the two-point enhanced corrections
  $dya= $psi * (1 - $xi )/( 1 - 2*$xi + 2*$xi**2 );
  $dyb= $psi * (   $xi )/( 1 - 2*$xi + 2*$xi**2 );
  # apply the update
  $ptab[$xa]+=$dya;
  $ptab[$xb]+=$dyb;
}
```

Embodiments included general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in a system having precision position control, the computer program product comprising a physical computer-readable medium having computer readable program code stored thereon, the computer readable program code comprising computer executable instructions that, when executed by a processor, cause the system to perform a method for adaptive impulse control as described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system controlling the output of a device, a method comprising:
  measuring a plurality of control efforts applied to a device over a plurality of intervals;
  measuring a plurality of output change amounts of the device that correspond to the applied plurality of control efforts;
  mapping the plurality of output change amounts directly to the plurality of control efforts in a control map, wherein mapping the plurality of output change amounts further comprises:
    selecting a set of points, each point defined as an ordered N-tuple where:
      N is a positive integer greater than or equal to two;
      one element of the N-tuple is indicative of an amount of device output change;

another element of the N-tuple is indicative of an amount of control effort; and N−2 additional elements of the N-tuple are indicative of system state prior to application of an amount of control effort;

repeating, until a calculated control error is within a tolerance of a desired output:

calculating control error as a difference between desired and present output;

reading, by interpolation or otherwise, an amount of control effort from the control map using the control error as an index indicative of desired change in output;

applying the amount of control effort thus read to the device;

waiting a sufficiently long interval for the transient, if any, resulting from the effort to subside;

calculating control error anew; and testing whether the newly calculated control error is within the tolerance of the desired output; and calculating a preferred intra-segment map update by:

measuring residual error as the difference between desired output and device output after an amount of control effort has been applied and the resulting transient, if any, has subsided;

evaluating control effort sensitivity as an estimated partial derivative of a differential amount of control effort with respect to a differential amount of device output change evaluated using mapped points surrounding the location in the map corresponding to the amount of output change equal to or approximately matching the control error prior to the application of the control effort; and calculating a preferred intra-sequent map update as the product of the measured residual error and the control effort sensitivity.

2. The method of claim 1, wherein the control map is spaced non-uniformly on a linear scale with respect to the output change amounts.

3. The method of claim 1, wherein the control map comprises a set of points spaced logarithmically with respect to the magnitude of change of output.

4. The method of claim 1, wherein N is a positive integer greater than or equal to three.

5. The method of claim 1, wherein the control map comprises four or more points.

6. The method of claim 1, further comprising initializing the control map by:

choosing a first set of positive and negative values, logarithmically or otherwise spaced in magnitude, to define control map points in terms of output change amount for which the control effort expected to effect each such defined output change amount is to be learned;

choosing a second set of positive and negative values as a training set, logarithmically or otherwise spaced in magnitude, to specify amounts of control effort to be applied to the device during a training exercise;

for each control effort in the training set:

applying a particular control effort from the training set;

waiting a sufficiently long interval for a transient, if any, resulting from the particular control effort to subside; and recording training results temporarily, the training results identifying a resulting output change amount associated with the applied particular control effort;

sorting the training results in terms of change of output;

interpolating, from the training results, an amount of control effort for each defined output change amount used to define map points; and storing each interpolated amount of control effort into the map as a baseline value of control effort expected to effect each respective defined output change amount.

7. The method of claim 1, wherein the calculation of applied control effort is based in whole or part on a linear combination of a control error and an integral of the control error.

8. The method of claim 7 wherein the amount of effort is measured as a time integral or sum of samples of a function of non-impulsive control effort.

9. The method of claim 1, wherein the control map points are spaced non-uniformly on a linear scale with respect to the change of output.

10. The method of claim 9 wherein the control map comprises a set of points spaced logarithmically with respect to the magnitude of change of output.

11. The method of claim 1, wherein control effort takes the form of a pulse and the amount of control effort is measured as a width of the pulse.

12. The method of claim 11 wherein the change of output is measured as a change in the position of the device.

13. The method of claim 1, further comprising:

calculating a set of weighting fractions by which the preferred intra-segment map update can be distributed among M map points, M being a positive integer greater than or equal to one but less than or equal to the total number of points in the map.

14. The method of claim 13, further comprising:

creating a departure map, separate from a baseline map containing baseline control effort values, wherein the departure map has identical abscissa values of output change of the baseline map, but the control effort ordinates are each a sum of a respective baseline ordinate value with the product of the preferred intra-segment update and a respective weighting fraction.

15. The method of claim 14, further comprising:

monitoring equipment health wherein a tolerance band is established about a baseline map, whether the baseline map be initialized, and whether the width of the tolerance band is uniform or not uniform;

reporting to an operator that equipment operation has departed from a tolerable standard if and when any point in the departure map leaves the established tolerance band.

16. The method of claim 14, further comprising:

monitoring equipment health wherein a tolerance band is established about a baseline map, whether the baseline map be initialized, and wherein a width of the tolerance band be uniform or not uniform;

calculating the mean or average drift velocity of each point of the departure map in units of control effort per unit time;

estimating a failure time at which a departure map point will leave the established tolerance band based on the mean drift velocity of the point and the difference between the point's ordinate and the particular edge of the tolerance band toward which the point is headed;

optionally calculating the standard deviation of the point's ordinate value and the point's drift velocity over several recent update;

reporting to the operator the estimated time to failure or time to required maintenance as the minimum of the estimated failure times found in the previous step;

optionally reporting to the operator a degree of statistical confidence in the estimated failure time using mean and standard deviation information to estimate.

17. The method of claim 13, further comprising:
updating an updated map, separate from a baseline map containing baseline control effort values, wherein the updated map has identical abscissa values of output change of the baseline map, but the control effort ordinates at end of each control iteration are the sum of the updated map's previous respective control effort value and the product of the preferred intra-segment update with a respective M-point distribution weighting fraction;
wherein the original values of each ordinate in the updated map on the first iteration being set equal to the values of the baseline map.

18. The method of claim 1, further comprising:
calculating control error as a difference between desired and present output;
reading, by interpolation or otherwise, an amount of control effort specifically derived from an updated control map, using the control error as an index indicative of desired change in output;
applying the amount of control effort thus read from the updated control map to the device;
waiting a sufficiently long interval for the transient, if any, resulting from the effort to subside;
calculating control error anew;
testing whether the newly calculated control error is within a tolerance of desired output;
repeating the above six steps until control error is within a desired tolerance.

19. The method of claim 18 wherein control effort comprises a pulse and the amount of effort is measured as a width of the pulse.

20. The method of claim 19 wherein a change of output is measured as a change in the position of the device.

21. The method of claim 19 further comprising application of a braking pulse subsequent to each pulse that causes motion.

22. The method of claim 19 further comprising superposition of a steady or low-frequency control effort offset to hold the device steady after any output change caused by the applied pulse.

23. The method of claim 19 further comprising any number of intermediate stages wherein at least one intermediate stage is driven by the adaptively calculated pulse signals and the position of the final output stage is used as the measured output.

24. The method of claim 23 wherein one intermediate stage is an electronic notch filter intended to mitigate unwanted resonances.

25. The method of claim 23 wherein a particular intermediate stage is an ON/OFF pilot valve and a final stage is a pneumatic or hydraulic actuator.

26. The method of claim 1, wherein:
the control effort is applied as a pulse and the amount of control effort is varied by controlling pulse width or the pulse amplitude.

27. In a system controlling the output of a device, a method comprising:
measuring a plurality of control efforts applied to a device over a plurality of intervals;
measuring a plurality of output change amounts of the device that correspond to the applied plurality of control efforts;
mapping the plurality of output change amounts directly to the plurality of control efforts in a control map, wherein mapping the plurality of output change amounts further comprises:
selecting a set of points, each point defined as an ordered N-tuple where:
N is a positive integer greater than or equal to two;
one element of the N-tuple is indicative of an amount of device output change;
another element of the N-tuple is indicative of an amount of control effort; and
N−2 additional elements of the N-tuple are indicative of system state prior to application of an amount of control effort;
repeating, until a calculated control error is within a tolerance of a desired output:
calculating control error as a difference between desired and present output;
reading, by interpolation or otherwise, an amount of control effort from the control map using the control error as an index indicative of desired change in output;
applying the amount of control effort thus read to the device;
waiting a sufficiently long interval for the transient, if any, resulting from the effort to subside;
calculating control error anew; and
testing whether the newly calculated control error is within the tolerance of the desired output; and
calculating a preferred intra-segment map update by:
measuring residual error as the difference between desired output and device output after an amount of control effort has been applied and the resulting transient, if any, has subsided;
evaluating control effort sensitivity using mapped points surrounding the location in the map corresponding to the amount of output change equal to or approximately matching the control error prior to the application of the control effort; and
calculating a preferred intra-segment map update as the product of the measured residual error and the control effort sensitivity.

28. In a system controlling the output of a device, a method comprising:
measuring a plurality of control efforts applied to a device over a plurality of intervals;
measuring a plurality of output change amounts of the device that correspond to the applied plurality of control efforts;
mapping the plurality of output change amounts directly to the plurality of control efforts in a control map, wherein mapping the plurality of output change amounts further comprises:
selecting a set of points, each point defined as an ordered N-tuple where:
N is a positive integer greater than or equal to two;
one element of the N-tuple is indicative of an amount of device output change;
another element of the N-tuple is indicative of an amount of control effort; and
N−2 additional elements of the N-tuple are indicative of system state prior to application of an amount of control effort;
repeating, until a calculated control error is within a tolerance of a desired output:
calculating control error as a difference between desired and present output;

reading, by interpolation or otherwise, an amount of control effort from the control map using the control error as an index indicative of desired change in output;

applying the amount of control effort thus read to the device;

waiting a sufficiently long interval for the transient, if any, resulting from the effort to subside;

calculating control error anew; and testing whether the newly calculated control error is within the tolerance of the desired output;

wherein the control map points are spaced non-uniformly on a linear scale with respect to the change of output;

wherein the control map comprises a set of points spaced logarithmically with respect to the magnitude of change of output;

wherein reading an amount of control effort from the control map comprises performing a log-log interpolation by:

reading an abscissa value for which an ordinate value is sought;

finding bracketing left and right abscissa values from the control map;

finding ordinate values associated with the left and right abscissa brackets;

taking a logarithm of the magnitude of all five values, as in $X_n = \log_b(|x_n|)$ where 'b' is any real positive base, $x_n$ is a pre-transformed value, $X_n$ is a post-transformed value, the five pre-transformed values comprising the left and right bracketing abscissa, the ordinates associated with the left and right bracketing abscissa, and one abscissa value at which an interpolated ordinate is sought;

linearly interpolating the log-transformed values to obtain a log-transformed interpolated ordinate Y;

inverse transforming the log-transformed interpolated ordinate by raising the base 'b' to the power of Y and multiplying by the sign of the nearest pre-transformed ordinate, as in $y=(b^Y)(sgn)$, where sgn=1 if the nearest pre-transformed ordinate was positive and sgn=−1 if the nearest pre-transformed ordinate was negative;

using this value y as the amount of control effort to be applied to the device; and defaulting to linear interpolation on the non-transformed values if any of the above bracketed or bracketing data are zero or involve a zero crossing.

* * * * *